Aug. 21, 1962  G. E. WIMMER  3,050,173
TRANSFER MECHANISM FOR VERTICALLY STACKED
ENVELOPES OR THE LIKE
Filed Oct. 24, 1960  7 Sheets-Sheet 1

INVENTOR.
Glen E. Wimmer
BY Horton, Davis,
Brewer & Brugman
Att'ys

INVENTOR.
Glen E. Wimmer
BY Horton, Davis,
Brewer & Brugman
Att'ys

United States Patent Office 3,050,173
Patented Aug. 21, 1962

3,050,173
TRANSFER MECHANISM FOR VERTICALLY STACKED ENVELOPES OR THE LIKE
Glen E. Wimmer, Evanston, Ill., assignor to B. H. Bunn Company, Chicago, Ill., a corporation of Illinois
Filed Oct. 24, 1960, Ser. No. 64,318
19 Claims. (Cl. 198—20)

This invention relates to apparatus for transferring vertically stacked groups of letters or the like from a horizontally moving conveyor to a tying machine having a horizontally disposed table on which the stacked letters are tied together.

In my copending application, Serial No. 60,945, filed October 6, 1960, there is disclosed apparatus for transferring groups of sorted envelopes from a horizontally moving conveyor to a first tying machine which ties the envelopes in one direction and for transferring the envelopes from the first tying machine to a second tying machine where the envelopes are tied in a direction transverse to that of the first tying machine. Means are also disclosed for ejecting a tied bundle from the second machine. The conveyor of the said prior disclosed apparatus is provided with spring-operated clips which hold groups of letters or the like on the conveyor with the planes of the letters disposed in a vertical position, that is, the letters are supported on their edges on the conveyor. The transfer mechanism is designed to accept groups of letters so disposed on the conveyor, the transfer being facilitated by the fact that the groups are resiliently held together by the clamping mechanism secured to and movable with the conveyor. Thus the conveyor is made to have a vertically downward movement at one end thereof to change the plane of the groups of letters from vertical to horizontal, and the transfer mechanism is designed to move toward and with a group of letters on the conveyor while the group is moving downward, whereby to pick off a group of letters from the conveyor and transfer it in its horizontal position to an adjacent tying machine.

In certain systems for handling mail it is desirable to use a different form of conveyor, namely, one whereon the letters are simply laid one upon another in stacks between flexible lugs secured to and movable with the conveyor. No springs or other means are used to hold a vertically stacked group of letters together and hence the pick-off and transfer mechanisms described in my aforesaid copending application are not adapted to accept mail from such conveyors.

It is accordingly an object of this invention to provide a transfer mechanism for transferring vertically and loosely stacked groups of letters or the like from a horizontally moving conveyor to an appropriately directed transfer mechanism, which, in turn, will transfer the group of letters to an adjacent tying machine.

Inasmuch as vertically stacked and relatively unconfined groups of letters may not be arranged in an orderly pile by the operator who places the mail originally upon the conveyor, such stacks, if presented in an uneven array to a tying machine, could not be properly tied into a tight bundle.

It is a further object of this invention to provide means, in a transfer mechanism handling loosely stacked groups of letters or the like, for automatically lining the members of the stack against a reference surface or surfaces so that one or more corresponding edges of the members of the stack will be aligned and the resulting stack will be presented to the typing machine in an orderly array.

In the transfer mechanism disclosed in my aforesaid pending application the transfer mechanism and tying machines are arranged in substantially the same plane so that each occupies a separate portion of the floor space adjacent the discharge end of the conveyor. In some installations, however, the available floor space is limited and is insufficient to accommodate the necessary transfer and tying mechanisms when the latter are arranged in side-by-side relation with respect to the conveyor.

Yet another object of this invention is to provide a combination of a mail carrying conveyor, a transfer mechanism, and a pair of tying machines wherein at least one of the tying machines is disposed above the conveyor to occupy a portion of the floor space occupied by the conveyor, the transfer mechanism being disposed to pick bundles of mail off the horizontally moving conveyor, elevate the bundles to the level of the tying machine disposed over the conveyor and to discharge the elevated bundles upon said tying machine.

As a more specific object this invention has within its purview the provision of a mechanism for aligning a mail carrying conveyor bucket or the like with a tying machine, and for transferring the mail from the bucket to the tying machine.

These and other objects of this invention will become apparent from the following detailed description when taken together with the accompanying drawings in which—

FIG. 2 is a perspective view of a bucket forming part of the transfer mechanism and adapted to carry a stack of letters or the like;

There is available at present a conveyor for carrying vertically stacked groups of letters between relatively flexible lugs mounted on the conveyor. Said conveyor is of double width and is designed to carry two rows of stacks of letters simultaneously. Such conveyor is particularly adapted for use in the sorting room of a post office where operators sorting mail at positions on both sides of the conveyor deposit the sorted mail in the row nearest them.

The invention will therefore be described with reference to such double conveyor and with reference to a double transfer mechanism adapted to transfer the stacks from the conveyors to two sets of tying machines. It is understood therefore that the transfer mechanism chosen to illustrate this invention is a dual one of two parts of which are symmetrically arranged about the longitudinal center line of the double-width belt conveyor. Functionally, however, the two sides of the transfer mechanism are identical, and in the following description reference may be had to one side or the other as convenience of illustration may dictate, rather than to adhere rigidly to a single side through the description of an element of the mechanism.

Figure 1:
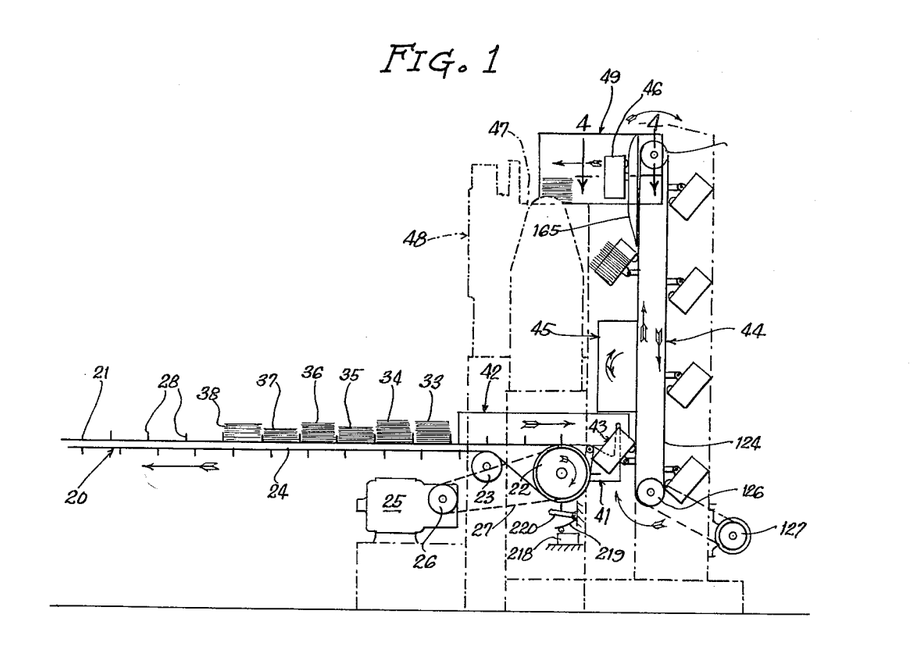
FIG. 1 is a schematic side elevational view of the discharge end of a conveyor for vertically stacked groups of letters and of the transfer means for transferring the mail from the conveyor to the surface of a tying machine elevated above the conveyor, the transfer mechanism and tying machine being shown in schematic outline.

Referring now to FIG. 1 for a general description of the invention, there is shown the discharge end of a conveyor belt 20 which may be made of the usual rubberized fabric and which has a top section 21 moving from left to right as viewed in FIG. 1 and passing over an end roller 22 and an adjacent guide roller 23 to form the bottom or return section 24 of the conveyor. Belt conveyor 20 is, of course, endless, the remaining portion of the conveyor being omitted for convenience in description. Said conveyor is driven from a motor 25 and a drive pulley 26 through a belt 27 passing around an appropriate pulley (not shown) secured to end roller 22.

The upper or exposed surface of the belt conveyor 20 is provided with spaced outwardly extending lugs 28 which, as shown in FIGS. 7 to 10, inclusive, are each T-shaped in front elevation, having a base 29 of rectangular shape and a substantially rectangular driving portion 30 extending upwardly from base 29 in the top section 21 of the conveyor. Said lugs 28 may be made of a resilient material, such as rubber, and bonded to the rubberized fabric of the conveyor 20. As further shown in FIGS. 7 to 10, inclusive, lugs 28 are arranged in spaced pairs of rows on the conveyor, the first pair being designated by the reference character 31 and the second pair being designated by the reference character 32. Each pair of rows is adapted to receive and guide a single row of stacks of envelopes or other substantially flat rectangular articles.

As shown in FIGS. 1, 7, 9 and 10, typical stacks of mail, such as 33, 34, 35, 36 and 37, may each be comprised of individual horizontally disposed envelopes 38 laid loosely one upon the other and not necessarily with their corresponding edges aligned, although each envelope is generally placed between adjacent lugs 28 with its small dimension between said lugs and its long dimension extending transversely of the belt and in general parallel with the plane of the driving portion 30 of the lug. Thus the edges of each stack, taken as a whole, may be quite uneven, and a stack may extend to various heights above or below the top edge 40 of a lug.

The ultimate objective of the apparatus shown in FIG. 1 is to tie a reach of twine around both the short and long dimensions of each of the stacks of mail or other flat articles 33 to 38, inclusive, on conveyor 20. The tying operation, as disclosed in my aforesaid copending application, can best be performed on two tying machines of the type shown, for example, in B. H. Bunn Patent 1,606,290 granted Nov. 9, 1926, for Tying Machine, each machine being adapted to tie a reach of twine around one dimension of a stack. Appropriate mechanisms, also as disclosed in my aforesaid copending application, may be provided for holding a stack on a tying machine, operating a trip mechanism for initiating the operation of a machine, transferring a tied stack from one machine to an adjacent machine for tying the stack along a transverse dimension, holding a stack on the second machine, tripping the operating mechanism of the second machine to effect the second tie and for ejecting a tied stack from the second machine into an appropriate receptacle. To save floor space, however, the tying machines of the present arrangement are mounted one above the conveyor belt 20 at the discharge end thereof and the other alongside the first machine and occupying floor space immediately adjacent the discharge end of said conveyor. Inasmuch as the details of construction of the tying machines does not form a part of this invention, and inasmuch as the trip mechanisms, the hold-down mechanisms, and the transfer mechanisms for transferring a tied stack from one machine to another and for ejecting a cross tied stack from the second machine are not part of this invention, they will not be described herein, reference for such details being had to the aforesaid Bunn Patent 1,606,290 and to my aforesaid copending application.

The essential parts of the transfer mechanism of this invention and their general location are shown in outline in FIG. 1. These are a stationary stack receiver 41 mounted immediately adjacent end roller 22 into which the stacks 33, etc. are pushed by a reciprocating rake shown in outline at 42 mounted above end roll 22 and stack receiver 41. A bucket 43 of a vertically movable conveyor 44 picks up the stack off the stack receiver 41 and elevates it to a stack jogging station 45 where the stack is shaken and caused to align two edges of the elements thereof in two planes. A fourth element of the transfer mechanism is a levelling station 46 on conveyor 44 where the stack is substantially aligned with the table 47 of a tying machine shown in dot-dash outline at 48, and the final element is a push-off mechanism shown in outline at 49 which pushes a stack from a bucket upon said table 47 where the first tying operation takes place.

*The Stack Receiver*

Figure 7:
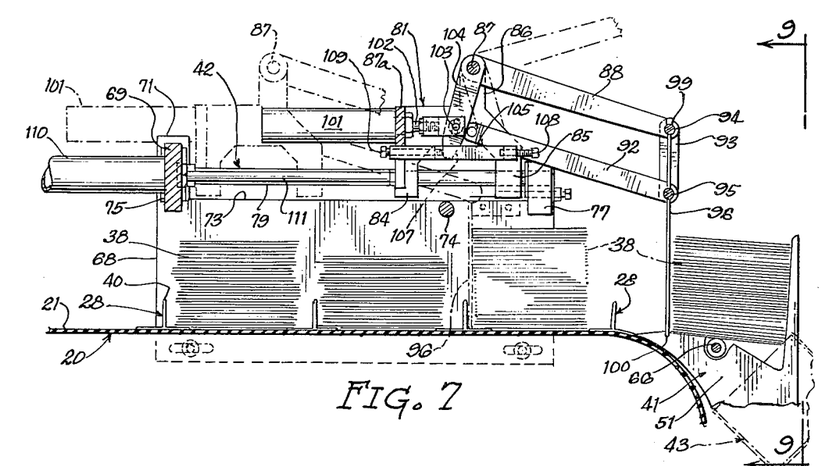
FIG. 7 is a fragmentary front elevational view of that portion of the transfer mechanism which removes a vertical stack of letters or the like from the conveyor to a stationary holder.
Figure 8:
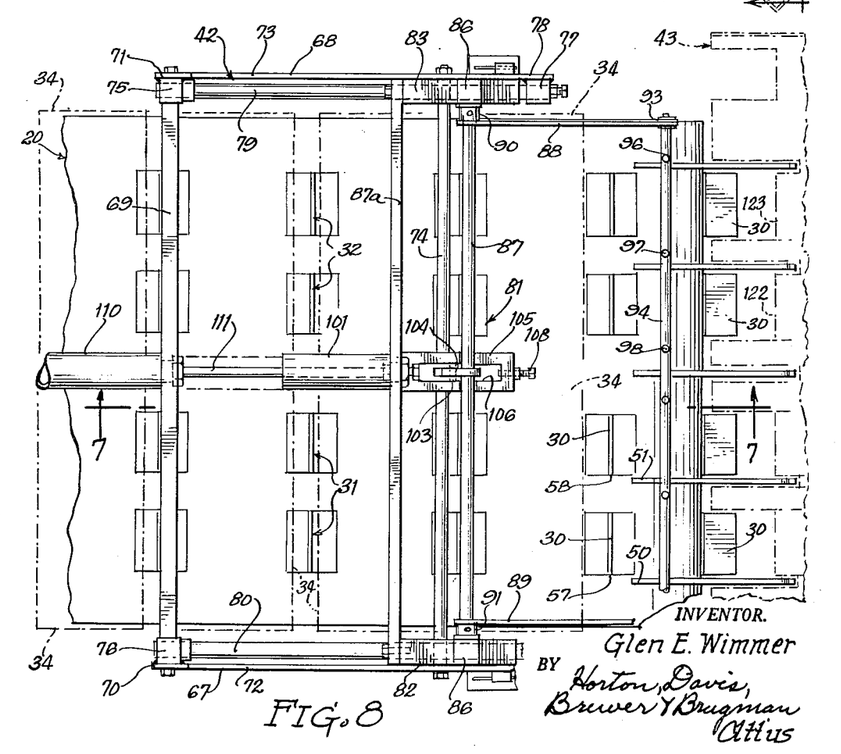
FIG. 8 is a plan view of the portion of the transfer mechanism shown in FIG. 7.
Figure 9:
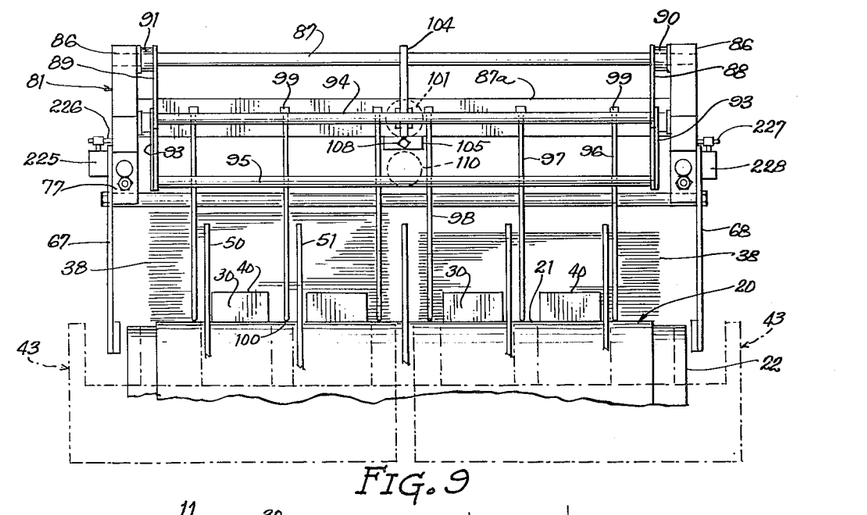
FIG. 9 is an end elevational view of the transfer mechanism of FIG. 7 looking to the left as shown by the arrows 9—9 in FIG. 7.
Figures 10, 11:
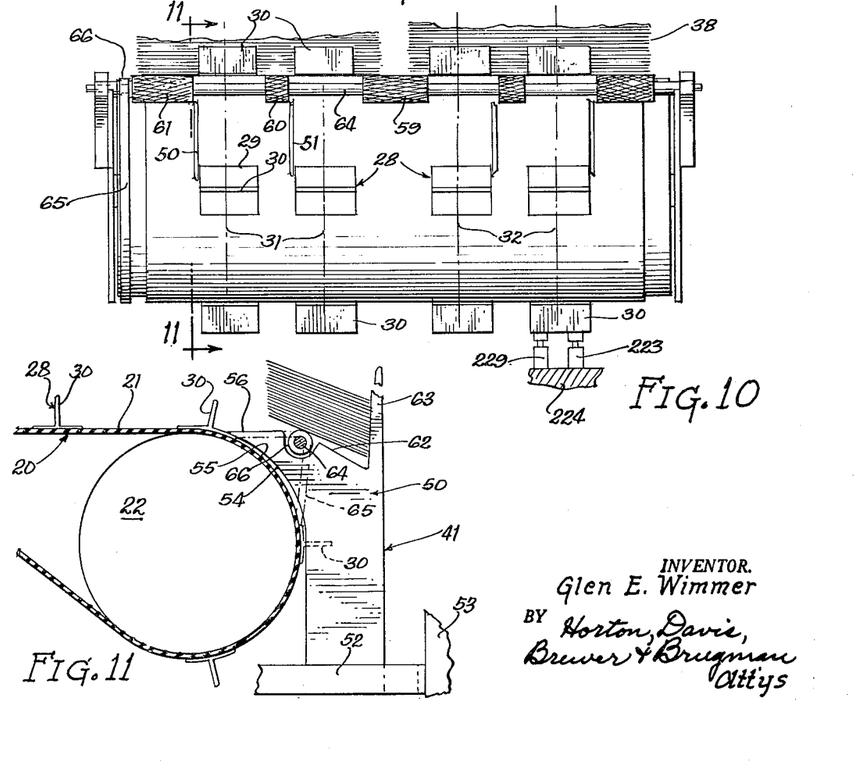
FIG. 10 is an end elevational view of a portion of the holding mechanism of FIG. 7.
FIG. 11 is a front elevational view, partly in section, of the holding device of FIG. 10, the section being taken along line 11—11 thereof.

Stack receiver 41 is shown in elevation in FIGS. 7 and 11 and in plan view in FIG. 8. It is comprised of a pair of plates 50 and 51 mounted with their planes in upright position and secured at their bottom regions to horizontal frame members 52 by spot-welding or the like, the frame members in turn being appropriately secured to a vertical frame member 53. The plates 50 and 51 are mounted parallel to one another and are identical in contour. Each plate has a rear edge 54 which is curved to extend in close proximity to the upper surface 55 of the conveyor belt 20 as it passes over roller 22. The top edge 56 is disposed slightly below the plane defined by the upper surface 55 before it reaches roller 22 and is adapted to pass under the forward edge of the lowermost envelope in a stack of mail to the end that the stack leaves the top surface 55 of the conveyor and moves horizontally upon the top edge 56 of the plate 50.

Inasmuch as the rear edge 54 of each plate is in close proximity to the top surface 55 of the conveyor, plates 50 and 51 are disposed relative to lugs 28 and particularly to the rectangular driving portions 30 thereof in such manner that said rectangular portions pass to one side or the other of the plates 50 and 51. For reason to be hereinafter made clear, said plates are arranged to pass as close to the edges 57 and 58 of the vertical portions 30 as is conveniently possible within the limits of accuracy with which said belt and lugs are constructed.

From top edge 56 the stack is urged to the right, as viewed in FIG. 11, over a plurality of axially aligned rollers 59, 60 and 61 upon a downwardly inclined edge 62 and against an upwardly inclined finger 63. Rollers 59, 60 and 61 are mounted on a shaft 64 appropriately mounted for rotation on the frame of the conveyor and driven from end roller 22 by a belt 65 and a pulley 66 mounted on the end of shaft 64.

Rollers 59, 60 and 61 are knurled to increase the friction between the rollers and the relatively light stacks of envelopes. The rollers are of such length as to fit into the spaces between the lugs 28. It may be noted from FIG. 11 that shaft 64 is located a distance from end roller 22 which enables it to just clear the tops of lugs 28.

*The Reciprocating Rack Mechanism*

If the movement of the stacks upon the plates 50 and 51 of the stack receiver were to be effected solely by the lugs 28, it would be found that the change in direction of the lugs as they passed around end roller 22 would impose a downward movement upon the envelopes at the bottom of a stack, and since the envelopes are supported against such movement by top edges 56 of the plates 50 and 51, the lowermost envelopes would be pulled down between said plates and the stack would be disarranged. The rake mechanism 42 is relied upon to push the stack into the stack receiver ahead of the lugs 28, and will now be described.

Referring to FIGS. 7 and 8, rake mechanism 42 is comprised of a pair of vertically disposed side plates 67, 68 secured at their lower regions to the frame of the conveyor (not shown). Side plates 67, 68, have upstanding ears 70, 71, extending from the upper edges 72, 73 of said side plates 67, 68, respectively, to which are welded or otherwise secured metal blocks 75, 76. A heavy, rigid bar 69 of rectangular cross section is bolted to blocks 75, 76 and this secures said side plates 67, 68 together. A tie rod 74 connects the forward upper regions of the said plates together. Similar blocks 77 are welded to slightly shorter ears 78 extending upwardly from the forward ends of side plate 68 and side plate 67 (not shown). To each pair of blocks 75, 77 and 70, 77 on a side plate is secured a guide rail 79 and 80, respectively, upon which slides a carriage designated generally by the reference character 81.

Carriage 81 is comprised of spaced slides 82, 83, each of which is an inverted Y-shaped member having spaced apertured arms 84, 85, through which a rail 79 or 80 extends, and a stem 86 in which one end of an oscillatable shaft 87 is rotatably mounted. A rigid bar 88, preferably of rectangular cross section, is secured to slides 82, 83, and forms the principal tie between the slides. A pair of arms 88, 89, each having a hub 90, 91, respectively pinned or otherwise fastened to shaft 87, extends forwardly toward stack receiver 41. A second pair of arms of substantially the same length as arms 88, 89, only one of which 92 is shown in FIG. 7, is pivoted at one end to each slide below the arms 88, 89. The ends of each pair of arms 88, 92, and 89, 92 is pivoted to a vertical link 93, the length of each link between pivots being substantially the same as the distance between pivots on the slides so that the linkage on each slide constitutes a parallel linkage, and hence oscillating movement of the arms 88 and 89, for example, does not alter the vertical disposition of links 93 moved thereby.

The pivots for links 93 on the arms 88, 89 and 92, are parallel rods 94, 95 through which extend loosely two groups of tines, each group having three tines, 96, 97, 98 spaced along the rods in a manner to avoid contact with lugs 28. Each tine has a head 99 and a rounded lower end 100, head 99 serving to limit downward movement of a tine relative to its supporting rods 94, 95. Said tines are normally held in their lowermost position by gravity, but are readily raised by any force greater than gravity acting upon them.

Arms 88, 89 and shaft 87 attached thereto are oscillated about the axis of said shaft 87 by a pressure-differential operated motor 101 secured to bar 88 and having a rod 102 reciprocated thereby, said rod being pivotally connected at 103 to an arm 104 secured to shaft 87 to cause shaft 87 to oscillate when rod 102 is reciprocated.

The limits of the oscillating movement of arm 104 are adjustably set by a plate 105 secured to bar 88 and having a slot 106 therein into which the free end 107 of arm 104 extends, and having further adjustable stops 108, 109 disposed in the path of movement of arm end 107.

It may be observed that operation of motor 101 results in a raising and lowering of tines 96, 97, 98 relative to conveyor belt 20. The desired movement of said tines, however, includes additionally a reciprocation of the tines in a horizontal direction so that the tines may drop behind a stack of envelopes at an appropriate time, push the stack forward upon the stack receiver 41, and then rise above the next stack and pass backward over said next stack to drop behind it, thus completing the cycle. The requisite horizontal reciprocation is produced by a pressure-differential operated motor 110 secured to bar 69 and adapted to reciprocate a rod 111, and connected at its forward end to bar 88.

It is contemplated that tines 96, 97, 98 will function as a rake to fall behind a stack of envelopes, but ahead of the rectangular driving portion 30 on conveyor lug 28, and will push the stack forward at a higher speed than the speed of the conveyor so that by the time the rectangular driving portion 30 changes its direction as it passes over end roller 22, the stack is beyond the reach of said portion 30. It is also contemplated that the tines will align the rear edges of the envelopes of a stack as the stack is pushed forward. In the event that the stack is so misaligned that the tines strike an envelope extending rearwardly across their path, the tines will not be forced downwardly through the envelope, but will ride on it and function normally as to the envelopes above the misplaced one.

*The Conveyor Bucket*

Figure 2:
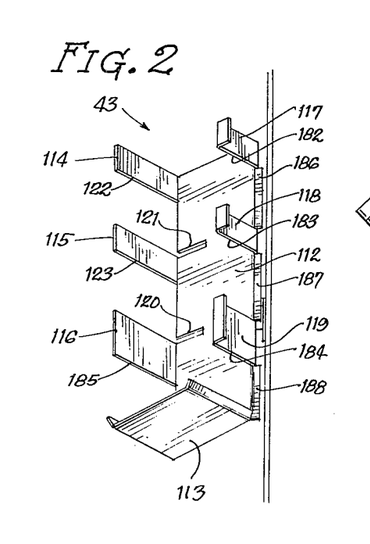
Figure 3:
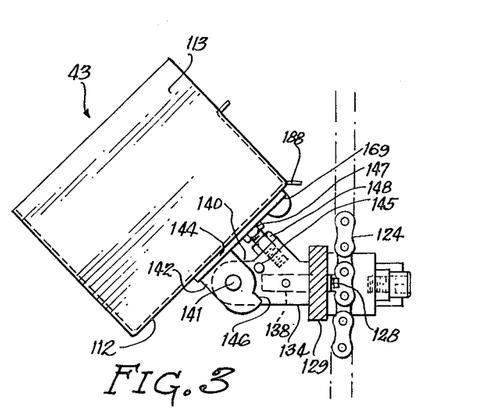
FIG. 3 is a side elevational view of a portion of the transfer mechanism showing the bucket of FIG. 2 and the manner in which it is supported from a chain conveyor forming an element of the transfer mechanism.

The stack on the stack holding device 41 is picked off by a vertically movable bucket 43, the novel form of which is calculated to allow it to pass through the stack holding device, and is also calculated to allow the lugs 28 to pass through it. At a later time in the complete transfer cycle, the design of bucket 43 allows a raking mechanism to rake a stack out of the bucket upon a tying machine. The bucket is shown in FIG. 2 and may be formed as a sheet metal stamping having a side wall 112, an end wall 113, three coplanar fingers 114, 115, and 116 functioning together as a bottom wall, and three coplanar fingers 117, 118 and 119 functioning together as a top wall. The length of the bucket measured from end wall 113 is greater than the average length of the envelopes in a stack. This is shown in FIG. 8 where the letters are depicted in plan view in dot-dash outline at 34, and a bucket 43 similarly shown fragmentarily for comparison. The purpose of this difference in length will be made clear hereinafter.

The buckets are normally supported on the vertically movable conveyor 44 in an inclined position as shown in FIG. 1. Since it is necessary that the buckets move under the stack while the stack is on plates 50 and 51, side wall 112 is slotted at 120 and 121 to allow the said plates to pass through wall 112. The buckets also pass in close proximity to the end roller 22, and it can now be explained that the reason for the use of discrete fingers 114, 115 and 116 instead of a solid wall is to provide slots 122 and 123 through which the lugs 28 and particularly the rectangular driving portion 30 thereof can pass. In addition to lugs 28, as may be seen from FIG. 8, the plates 50 and 51 also pass through the slots 122 and 123.

Buckets 43 are secured to and movable with a chain conveyor (FIGS. 1, 3, 4 and 5) comprising spaced endless roller chains 124 passing around upper and lower sprockets 125, 126 and driven from a motor 127. The support for each bucket comprises specially formed links in the spaced chains having diverging ears 128 which are bolted to a conveyor flight in the form of a bar 129. On the ends of bar 129 are welded vertically disposed straps 130, 131 to the tops and bottoms of which are secured laterally outwardly extending guide rollers 132, 133 which ride in a vertically disposed slot 135 in a guide bar 136 fastened to an angle iron 137 forming part of the frame of the conveyor.

The means by which buckets 43 are secured to bar 129 comprises a bracket 134 which is pinned to a rock shaft 138, rotatably mounted in bar 129 and extending therethrough, and through a bearing 139 secured to said bar 129. Bracket 134 has an ear 140 through which passes a pivot pin 141, the ends of which are pinned to spaced lugs 142, 143 secured to a plate 144 spot welded or otherwise secured to side wall 112 of bucket 43. Rotation of bucket 43 around the axis of pin 141 in one direction is limited by a stop pin 145 extending laterally from bracket 134 and engageable by an abutment 146, and rotation of bucket 43 about said axis in the opposite direction is limited by an adjustable screw 147 and lock nut 148 extending from bracket 134 and engageable by plate 144. Stop pin 145 is located with reference to abutment 146 to arrest the rotation of bucket 43 when the side wall 112 is disposed in a vertical plane, and adjustable screw 147 holds bucket 43 in an angular position shown in FIG. 3. A torsion spring 149, coiled around a spacer sleeve 150 surrounding pivot pin 141, has one end (not shown) anchored on ear 143 and its other end (not shown) anchored on ear 140 and is coiled in a direction to impress a clockwise force on ear 143 as viewed in FIG. 3.

The Stack Jogging Station

Oscillation of bucket 43 about the axis of rock shaft 138 is effected by a rocker arm 151 appropriately secured to shaft 138 and turned in one direction by a roller 152 secured to the end of one arm 153 of said rocker arm 151 and contacting a cam 154 formed on the end of a plate 155 secured to a frame member 156. Turning of shaft 138 in the opposite direction is effected by a tension spring 157 anchored at one end on a pin 158 on bar 129 and at its other end on a pin 159 on the other arm 160 of rocker arm 151. Turning of rocker arm 151 in one direction by tension spring 157 is limited by a pin 161 extending laterally from bar 129 and engaged by an abutment 162 on arm 160, and turning of rocker arm 151 in the opposite direction is limited by a pin 163 secured to bar 129 and engaged by the opposite side of arm 160. Although cam 154 normally controls the turning of rocker arm 151 in one direction, it is anticipated that the movement of roller 152 over cam 154 will be very rapid and that the momentum in said rocker arm produced by the mass of the devices secured thereto will cause said arm to over-travel and will make necessary the stop 163.

Figure 6:
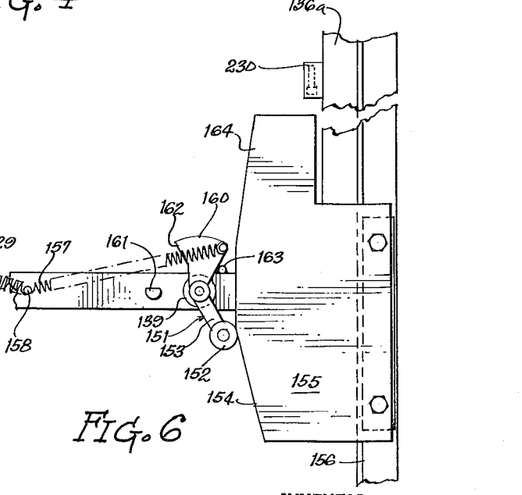
FIG. 6 is a fragmentary end elevational view of the cam mechanism for turning a bucket along an axis parallel to the direction of movement of the conveyor.

The stack jogging station 45 is designed to oscillate quickly a bucket 43 and the envelopes contained therein to cause said envelopes to strike end wall 113 and thus to align all envelopes in the bucket with said end wall. The oscillation impels a bucket to turn about the axis of shaft 138 from a horizontal position to a vertical position and back to a horizontal position. This oscillation is effected by follower 152 as it rides up cam 154 (FIG. 6) and then down a return cam 164, the relative movement between the cams and followers being an incident of the vertical upward movement of bar 129. It may be recalled that the buckets 43 are longer than the stacks, and that the buckets are disposed to accept the stacks with the stacks spaced from end wall 113. The rapid oscillation of the bucket and its envelopes from a horizontal position to a vertical position drops the envelopes down against end wall 113 and effects the desired alignment of the end edges thereof.

The Levelling Station

Continued vertical upward movement of buckets 43 after passing the jogging station 45 brings them to an intermediate station where they are rotated about their horizontal pivot pin 141 until fingers 114, 115, 116 are in a horizontal plane, thus restoring the stack from its tilted position wherein spilling of the envelopes out of the bucket is minimized, to the horizontal position in which it is desired to present the stack to the tying machine 48. The said rotation is produced by the action of a cam 165, shown in FIGS. 1, 4 and 12, upon a follower on bucket 43 in the form of a button 169, said cam comprising a plate secured to a flange 166 on a second plate 167 bolted or otherwise secured to angle iron 137 on the frame of the machine. A spacer 168 may be inserted between plate 167 and angle iron 137, in the machine illustrated, to avoid contact between said plate 167 and vertically moving bar 129 of the conveyor 44. Button 169 contacts a rise 170 on cam 165 as the bar moves vertically and in the process, rotates bucket 34 to the position shown in FIG. 12. From rise 170, button 169 moves over a dwell 171 during which the stack is moved off the bucket 43 and upon the table 47. Further movement of bucket 43 causes button 169 to traverse a return portion 172 of cam 165 to allow spring 149 to restore the bucket to its tilted position.

The Push-Off Mechanism

Figure 12:
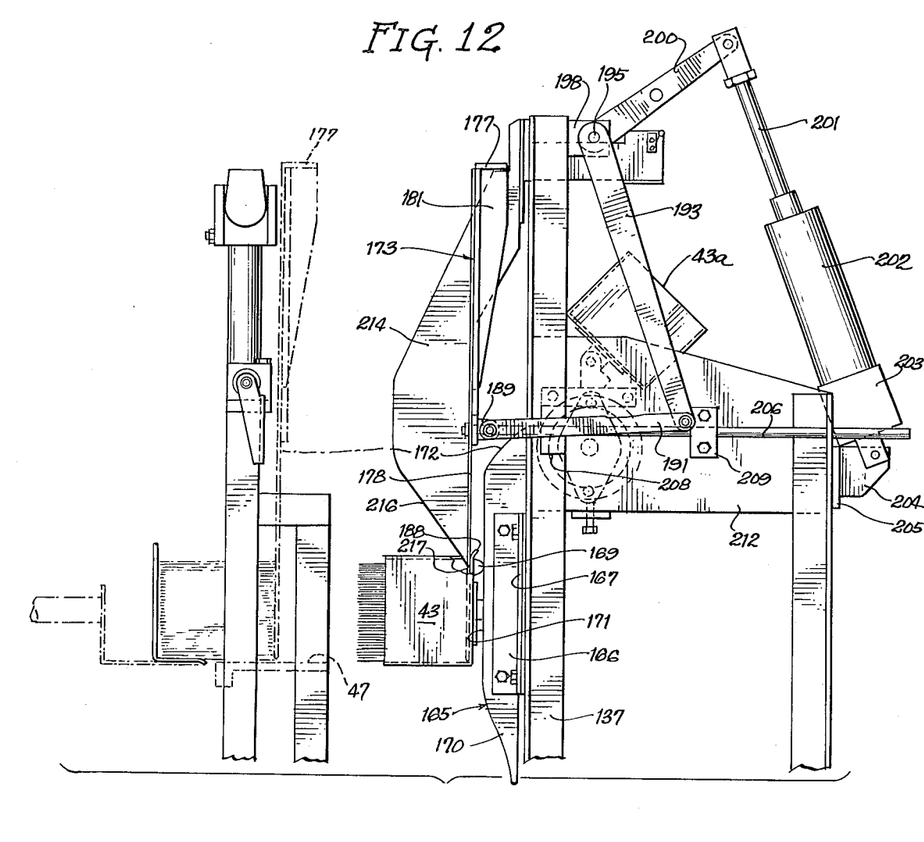
FIG. 12 is a side elevational view of the upper portion of the transfer mechanism of FIG. 1 on an enlarged scale and showing particularly the mechanism for transferring a stack of mail or the like from the vertical portion of the transfer mechanism to an adjacent tying machine.
Figure 13:
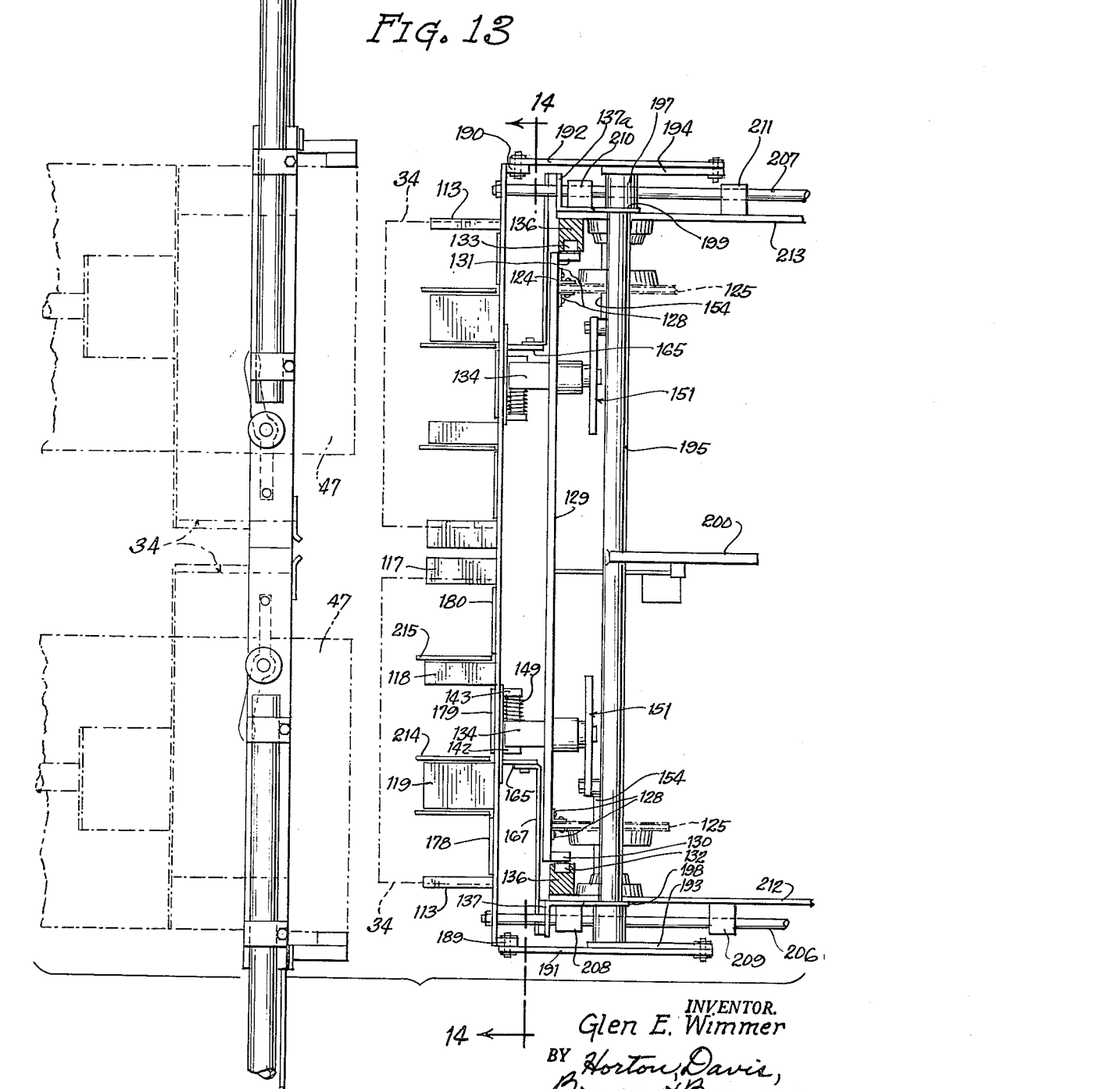
FIG. 13 is a plan view of the portion of the transfer mechanism shown in FIG. 12.
Figure 14:
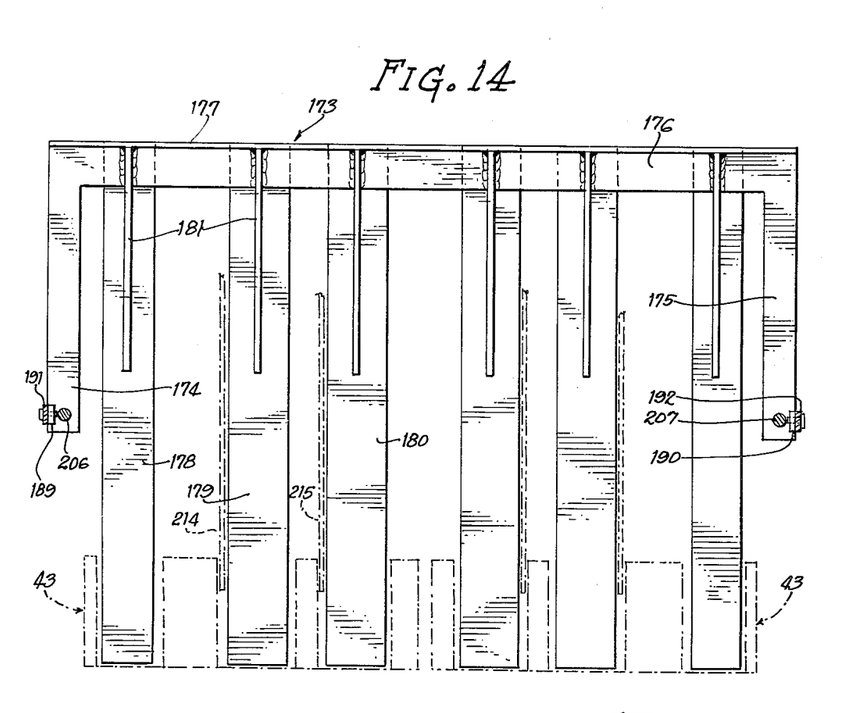
FIG. 14 is an elevational view of the portion shown in FIG. 13, looking in the direction of the arrows 14—14 in the latter figure.

The push-off mechanism 49, by which the stack is removed from the bucket 43 to the table 47 of the tying machine 48 is shown in FIGS. 12, 13 and 14. It is comprised essentially of an inverted U-shaped frame designated generally by the reference character 173 having downwardly extending legs 174, 175 and a cross piece 176 connecting the legs. U-shaped frame 173 extends across the top region of the vertically movable conveyor 44 and beyond the end regions of the frame of said conveyor as viewed in FIG. 13. A bar 177 is welded across the top edge of cross piece 176 to give said cross piece stiffness in a horizontal direction. A plurality of elongated, downwardly extending plates 178, 179, 180 is secured by welding or otherwise to the front face of cross piece 176, said plates extending below the lowermost ends of legs 174, 175 to a point approximately level with the table 47 of the first tying machine 48. Gusset plates 181 are welded to plates 178, 179, 180, and to bar 177, to stiffen approximately the upper half of each of said plates.

The horizontal dimension of each plate 178, 179, 180, and the spacing between them are determined by the width and location of the spaces 182, 183 and 184 (FIG. 2) between respectively fingers 117 and 118, fingers 118 and 119, and between finger 119 and end wall 113. These spaces are identical in size and location to the spaces 122 and 123 and to the space 185 between finger 116 and end wall 113, respectively, so that plates 178, 179 and 180 may be inserted vertically into a bucket 43, when the latter is in the horizontal position shown in FIG. 12, without contacting said fingers.

It is intended that plates 178, 179 and 180 will not move vertically, but will be stationed in a manner to pass between the edges of the stack of envelopes in a bucket 43 and the side wall 112 thereof as the bucket is moved upwardly. To make certain that the plates will enter between the stack and wall 112, outwardly curved flanges 186, 187, 188 are formed at the top edge of wall 112 which guide the ends of the plates into the bucket behind the stack. After the plates have been so inserted, the frame 173 is given a horizontal movement by a mechanism now to be described, to push the stack out of the bucket 43 and upon tying machine table 47.

Frame 173 has ears 189 and 190, secured by welding or the like to the lower extremities of legs 174 and 175, in which are pivoted the ends of links 191, 192. Said links are pivoted at their other ends to arms 193, 194 secured to a rock shaft 195 pivoted in bearings 196, 197 supported on brackets 198, 199, respectively, welded to the angle irons 137 and 137a of the frame of the conveyor. Centrally located on rock shaft 195 is an arm 200 which is rigidly secured to said rock shaft, the free end of arm 200 being pivotally connected to the reciprocating rod 201 of a pressure-differential operated motor 202, the housing 203 of which is pivoted on a bracket 204 extending outwardly from a bar 205 secured to the frame of the vertically movable conveyor.

U-shaped frame 173 is supported on the ends of spaced rods 206, 207 extending horizontally from said frame and passing through guides 208, 209 and 210, 211, respectively secured to plates 212, 213 forming part of the frame of the vertically movable conveyor 44. Said rods and guides limit frame 173 to a rectilinear movement toward and away from table 47. It may be observed therefore that reciprocation of rod 201 causes a rocking of shaft 195 through arm 200, and an oscillation of arms 193, 194, the latter movement then being transmitted through links 191, 192 to frame 173 to impart a reciprocating movement thereto.

Inasmuch as plates 178, 179, 180 are normally at rest between a stack in bucket 43 and the return path of a bucket as depicted in FIG. 12 at 43a, should the motor 202 fail to operate and a stack be carried in a bucket upward and around to the position of the bucket 43a, the stack would be compressed against the plates 178, 179, 180 and the bucket 43 and possibly other parts of the conveyor would be damaged or destroyed, as well as some of the elements of the stack. To prevent such damage, a safety device is used which makes certain that the buckets are empty before continuing around the conveyor path to the position shown at 43a. This device is in the form of a pair of identical plates 214, 215, which extend into the spaces 123, 183 and 122, 182, respectively, between the fingers in the bucket, the lower edges 216 of the plates being disposed at an angle with the horizontal as shown in FIG. 12, with the points 217 formed at the bottom of the plates disposed behind the stack. The width of plates 179, 180 is decreased sufficiently to allow for plates 214, 215 sharing the spaces between fingers occupied by said plates.

Vertical movement of a bucket 43 relative to plates 214, 215 will cause the stack to strike edges 216 and be forced to the left as viewed in FIG. 12 to move the entire stack out of the bucket. Although no provision is made to catch the envelopes or other matter making up the stack, so that the stack is thereafter scattered, damage to the buckets and conveyor is averted and the envelopes may be retrieved.

*The Controls*

The pressure-differential operated motors used in the foregoing mechanism may be pneumatic cylinders having electromagnetically operated valves controlled by micro-switches placed at various points throughout the mechanism to cause moving parts of the latter to trip the said micro-switches in predetermined sequence. Said motors, micro-switches and valves are of known construction and the details thereof will not be described herein. The designs of such motors, valves and micro-switches disclosed in my aforesaid pending application are particularly suitable for use in the present mechanism.

It is contemplated that belt conveyor motor 25 will run continuously, whereas chain conveyor motor 127 will run intermittently. Further, the linear speed of chain conveyor 44 is designed to be approximately twice that of belt conveyor 20 so that a bucket 43 will be passed through holding device 41 before the next stack is pushed thereinto. Thus buckets 43 are spaced apart on chain conveyor 44 approximately twice the distance between adjacent lugs 28 on the belt conveyor. Since belt conveyor 20 runs continuously, its movement is utilized to time the movement of the chain conveyor motor 127. Thus, as shown schematically in FIG. 1, a micro-switch 218 is mounted on the frame of conveyor 20 in contact with a resilient arm 219 of a bell crank the other arm 220 of which extends into the path of movement of the rectangular driving portion 30 of a lug 28 on belt conveyor 20. It is contemplated that micro-switch 218 will energize a relay which in turn will energize motor 127, and that said relay will be held in energized condition until deenergized by a second switch. Such motor control circuits are known and will not be described herein in detail.

The second switch mentioned above is shown in FIG. 5 at 221, and is similarly a micro-switch mounted on guide bar 136 and having a contact lever 222 which extends into the path of movement of strap 130 as the latter moves upwardly along said guide bar. Due to inertia forces developed in the conveyor 44 and in motor 127, the latter will continue to run for a time at a decelerating rate after it has been deenergized.

Also timed by the movement of conveyor belt 20 is a micro-switch shown in FIG. 10 at 223, said switch being mounted on a frame member 224 and having an operative arm adapted to be contacted by the driving portion 30 of a lug 28. The function of said micro-switch is such as to cause an operation of pressure-differential operated motor 101 (FIG. 7) which will move rod 102 to the left as viewed in FIG. 7, thereby dropping the tines 96, 97, 98 down upon belt conveyor 20. The location of micro-switch 223 is selected to cause such downward movement when carriage 81 is at its left hand position as viewed in FIG. 7, preparatory to moving forward to push a stack such as 33 upon stack receiver 41. It will be appreciated that the dropping of the tines must be synchronized with the movement of belt conveyor 20 so that said tines will drop ahead of lug portion 20, but behind a stack placed between that portion and the next lug portion 20 to the right of the stack as seen in FIG. 7.

Tines 96, 97, 98 are raised at the end of the forward stroke of motor 110, that is, after the stack has been pushed into the stack receiver 41. This is accomplished by causing an abutment 226 of carriage 81 to strike the movable contact of a micro-switch 225 mounted on side plate 67, said micro-switch 225 causing motor 101 to move rod 102 to the right as viewed in FIG. 7 and through the associated parallel linkage, to raise rod 94 and tines 96, 97 and 98.

Carriage 81 must be returned quickly to its left hand position (FIG. 7) after a stack has been pushed by tines 96, 97, 98 upon stack receiver 41. This return movement is initiated when an element 227 of carriage 81 strikes the movable contact of a micro-switch 228 mounted on side plate 68, said micro-switch causing pressure-differential operated motor 110 to pull rod 111 and the associated carriage 81 to the left as viewed in FIG. 8. Forward movement of carriage 81 is triggered by a micro-switch 229 (FIG. 10) mounted on frame member 224 and adapted to be operated by contact of the operative arm thereof by the portion 30 of a lug 28 on belt conveyor 20, said micro-switch causing motor 110 to operate in the opposite sense and effect a movement of rod 111 to the right as viewed in FIG. 8 to push a stack into the stack receiver 41. As is available in known commercial designs of pressure-differential operated motors of the pneumatic type, valves are provided which regulate the rate at which air is admitted to each side of the motor. In the present design, it is contemplated that the return stroke (i.e. to the left in FIG. 8) will be approximately ten times as rapid as the forward stroke to make certain that the tines and parallel linkage are out of the way of the buckets 43 as they move upward on chain conveyor 44.

Figure 4:
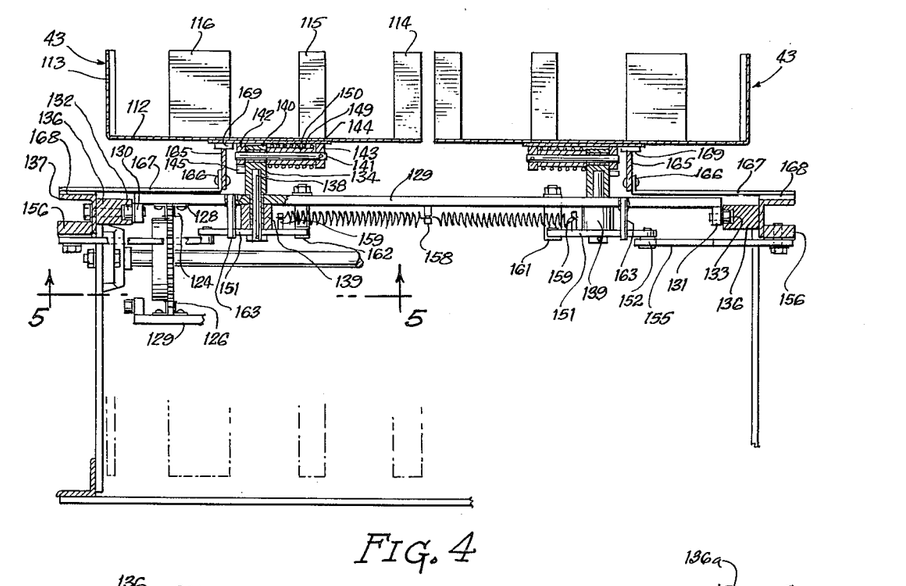
FIG. 4 is a plan view of a portion of the transfer mechanism taken approximately along line 4—4 of FIG. 1 showing the means for turning the mail carrying buckets of FIGS. 2 and 3.
Figure 5:
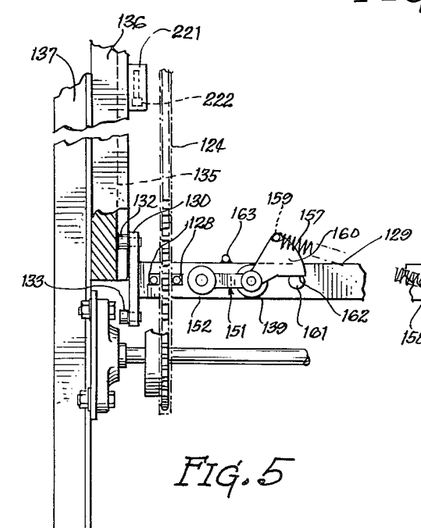
FIG. 5 is a fragmentary end elevational view of the mechanism of FIG. 4 taken along line 5—5 thereof.

The operation of pressure-differential operated motor 202 (FIG. 12), which ejects a stack from a bucket 43 onto the table 47 of the first tying machine, is controlled by a micro-switch 230 (FIG. 6) mounted on guide bar 136a. The operative element of switch 230 is contacted by strap 131 (FIG. 4). Motor 202 is of the type which automatically returns when its rod 201 has reached the outer limit of its movement, and hence no additional switch means is required to bring about the return movement of the rod. Thus it is intended that the plates 178, 179, 180 move toward the tying machine table 47 and then return immediately upon pushing a stack thereon.

Operation

Figure 15:
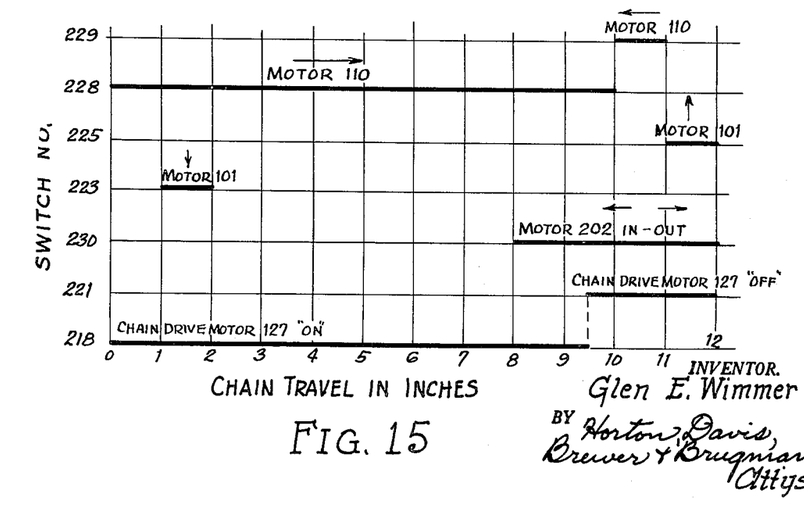
FIG. 15 is a timing and sequence diagram for the several electric and pressure-differential operated motors used in the mechanism.

The sequence of operation of the various elements of the transfer mechanism can best be understood by reference to the sequence and timing diagram shown in FIG. 15. The travel of chain 124 is shown on the horizontal axis in one-inch increments, and the switches are shown on the vertical axis.

Assuming that the belt conveyor 20 is being driven by its motor 25, micro-switch 218 will be rendered operative by the passage of a lug thereby, and chain conveyor motor 127 will be rendered operative by the relay controlled by said switch 218. Movement of chain conveyor 44 causes a bucket 43 to move through the stack receiver 41 to pick off a stack of envelopes held thereon. The adjacent bucket 43 above stack receiver 41 will be oscillated by cam 155 and follower 152 about the axis of rock shaft 139 to jog the stack and line up two of the corresponding edges of the envelopes in the stack. The bucket next removed from the one in the stack jogging station 45 will ride up on cam 165 to assume a horizontal position and will move up to the level of tying machine table 47. Plates 178, 179, 180 will move between side 112 on bucket 43 and the stack disposed therein during the same upward movement of the bucket. During the movement of chain conveyor 44, carriage 81 moves toward a bucket, with tines 96, 97, 98 lowered and pushing against the stack next to be placed in stack receiver 41.

It may be noted that carriage 81 continues to move forward a short time after chain conveyor 127 is shut off. This enables the tines to push the stack on the rollers 59, 60 and 61 so that the latter can continue the forward movement of the stack. The speed of carriage 81 is regulated through the regulation in known manner of the admission of air to the pressure-differential operated motor 110 so that carriage 81 moves slightly faster than belt conveyor 20 and the stack is then as far removed from lug 28 to its rear as possible to avoid destructive contact between the said lug and lowermost envelopes.

Just before a bucket 43 begins to pick a stack of stack-receiver 41, carriage 81 strikes switches 225, 228 and quickly elevates tines 96, 97, 98 and simultaneously reverses the direction of carriage 81. The complete return movement of the carriage takes place in one-tenth the time it takes for the carriage to move forward.

The pressure-differential operated motor 202 which operates the ejector plates 178, 179, 180 is energized as soon as the bottom of a bucket 43 is aligned with the lowermost tips of such plates. Chain conveyor 44 continues to move up approximately two inches, thereby elevating a stack while said stack is being ejected. This brings the stack slightly above the table 47 of the first tying machine and makes certain that the stack is above the table as it moves out of a bucket to prevent damage to the lowermost envelopes in a stack. Inertia forces keep the chain conveyor 44 moving at a decelerating rate after motor 127 has been deenergized, and the ejector plates are returned to their starting position during approximately two-inch movement of the chain conveyor. It is understood that the spacing between buckets 43 is considerably greater than the four inches of chain travel which takes place during the entire ejection cycle. If the ejected plates should return before a bucket has moved around upper sprocket 128, no harm is done since the plates simply pass into the slots 122, 123 and 185 between bottom-forming fingers 114, 115 and 116 and end wall 113.

As previously explained, should ejector motor 202 fail to function, the upward movement of a bucket will cause any envelopes in the bucket to be ejected by the fixed cam edges 216 which enter the bucket behind such envelopes and force the envelopes out of the bucket.

It is understood that the precise location of switches 218, 221, 230, 223, 225, 228 and 229 may be adjusted to change the time at which they are to function and that appropriate adjustable mountings (not shown) may be provided for those switches the location of which is particularly critical. It is understood further that although the present invention has been described with reference to its application to a belt conveyor 20 of double width, capable of handling two rows of stacks of envelopes it can readily be modified by one skilled in the art to operate with a one-row belt.

I claim:

1. A transfer mechanism for transferring a stack of envelopes arranged in one plane from one level to another level and in a plane parallel with said one plane, said mechanism comprising a conveyor movable in said one plane and on which said stack is carried with the envelopes thereof disposed one upon the other, a stationary stack receiver disposed in line with the direction of movement of the conveyor, means for transferring the stack from the conveyor to the stack receiver, said stack receiver having spaced supports leaving bottom areas of the stack in said one plane exposed, a vertically movable conveyor having stack carrying buckets movable therewith, said buckets having fingers contacting the stack at the exposed bottom areas thereof and adjusted to transfer the stack from the stack receiver to the vertically movable conveyor, and means at the said other level adapted to enter a stack-carrying bucket as the latter moves to said other level and to push the stack out of said bucket.

2. A transfer mechanism as described in claim 1, comprising further a frame for the vertically movable conveyor, said buckets having surfaces therein against which certain of the edges of the stack may be aligned, and interengaging means on the buckets and said frame for agitating the stack against said surfaces, whereby to bring said edges into alignment with said surfaces.

3. A transfer mechanism as described in claim 1, comprising further a frame for the vertically movable conveyor, a bracket secured to the bucket, a rock shaft supporting the bracket from the vertically movable conveyor, said buckets having surfaces therein against which certain of the edges of the stack may be aligned, and interengaging means on the rock shaft and said frame for oscillating said rock shaft for agitating said stack against said surfaces, whereby to bring said edges into alignment with said surfaces.

4. A transfer mechanism as described in claim 1, comprising further a frame for the vertically movable conveyor, a bracket secured to the bucket, a rock shaft supporting the bracket from the vertically movable conveyor, an arm secured to the rock shaft, a cam follower on the arm, a cam on the frame engageable with the follower and shaped to cause said rock shaft to rotate in one direction, and resilient means on the conveyor associated with the bracket for rotating said rock shaft in the opposite direction.

5. A transfer mechanism as described in claim 1, said vertically movable conveyor including a pair of spaced parallel endless roller link chains, a bar extending across said spaced chains and secured thereto for movement with the chains, a frame on which the chains are mounted, a bracket secured to the bucket, a rock shaft journalled in said bar and connected to the bracket for supporting the bracket from the bar, an arm secured to the rock shaft, a cam follower on the arm, a cam on the frame engageable with the follower and shaped to cause said rock shaft to rotate in one direction, and resilient means on the bar and associated with the bracket for rotating said rock shaft in the opposite direction.

6. A transfer mechanism as described in claim 1, said stack receiver comprising spaced supports each having a downwardly inclined stack supporting surface and an upwardly inclined stop surface for limiting movement of the stack down the inclined surface.

7. In combination, a vertically movable conveyor, means on the conveyor for supporting a stack of envelopes, and means for ejecting the stack from the supporting means on the conveyor, said conveyor comprising spaced endless chains, bars connecting the chains, brackets secured to the bars, stack-carrying open-sided buckets supported by the brackets, ejecting means adapted to enter a bucket adjacent a stack carried therein, means for moving the ejecting means toward the open side of the bucket to eject a stack therefrom, and other means insertable into a bucket as a function of the movement of the conveyor for ejecting a stack in the event the first-mentioned ejecting means fails to operate.

8. In combination, a vertically movable conveyor, means on the conveyor for supporting a stack of envelopes in a position inclined to the horizontal, horizontally movable means for ejecting a stack of envelopes from said stack-supporting means, and means on the conveyor and cooperating with the stack-supporting means to turn the latter to a horizontal position prior to the operation of the horizontally movable ejecting means.

9. In combination, a vertically movable conveyor, a bucket adapted to support a stack of envelopes, means on the conveyor for carrying the bucket, said bucket comprising a sheet metal container having a side adjacent the conveyor, an open side opposite the first-mentioned side through which a stack is received and ejected, a plurality of fingers extending from the first-mentioned side and forming the bottom of the bucket, a plurality of fingers extending from the first-mentioned side above the stack and comprising the top of the bucket, the bottom- and top-forming fingers being vertically aligned, ejector plates aligned with the spaces between said top-forming fingers, said bucket being movable by the conveyor toward the ejector plates and aligned to admit the ejector plates adjacent the first-mentioned side, and means for imparting a lateral motion to the ejector plates in the direction of the open side of the bucket, whereby to eject the stack from the bucket.

10. The combination described in claim 9, said bucket-carrying means comprising a bracket having a first part connected to the bucket, a second part connected to the conveyor, a pivotal connection between the first and second parts having a horizontal axis, means limiting relative rotation of the first and second parts about said axis in one direction to a horizontal position of the bottom-forming fingers and in the opposite direction to an inclined position of the bottom-forming fingers downward toward the conveyor, resilient means normally urging said parts in a direction to incline said bottom-forming fingers downward, a fixed conveyor frame, and cooperating cam end follower parts on the bucket and conveyor frame for turning the bucket to, and holding it in a position wherein the bottom forming fingers are horizontal to align the bottom- and top-forming fingers vertically and admit the ejector plates adjacent the first-mentioned side as aforesaid.

11. The combination described in claim 9 and including further a fixed conveyor frame, wedge-shaped plates secured to the conveyor frame with the planes of the wedge-shaped plates disposed in the direction of movement of the ejector plates, and with the point of the wedge extending between the first-mentioned side and the stack in a bucket, said plates imparting a lateral movement to a stack in a bucket toward the open side of the bucket in the event the ejector plates do not function.

12. The combination described in claim 9, and including further a fixed conveyor frame, and wedge-shaped plates secured to the frame with the planes of the wedge-shaped plates disposed in the direction of movement of the ejector plates, said wedge-shaped plates being disposed next to the ejector plates lengthwise of the bucket, with the point of the wedge extending between the first mentioned side and the stack in a bucket.

13. In combination, a horizontally movable belt conveyor having a plurality of spaced substantially parallel abutments movable with the belt conveyor, said abutments being arranged on the conveyor to cause abutments in adjacent rows to lie in substantially the same vertical plane and to be spaced from one another in said plane, said belt conveyor being adapted to receive stacks of envelopes between abutments in a row, said envelopes being of a size relative to the abutments to extend across two rows of abutments, a vertically movable conveyor disposed adjacent the horizontally movable conveyor, a plurality of stack-holding devices disposed between the horizontally and vertically movable conveyors and between said rows of abutments such that said stacks of envelopes can be transferred from the horizontally disposed conveyor to the holding device by horizontal movement of the stacks toward the holding devices, a stack receiving receptacle secured to the vertically movable conveyor and movable therewith, said stack-receiving receptacle having slotted top and bottom walls and an open side through which the stack is inserted and removed and said top and bottom walls being adapted to pass between said stack holding devices to pick off a stack of envelopes therefrom and carry said picked-off stack vertically, ejector plates mounted adjacent the vertically movable conveyor at a position elevated with respect to said horizontally movable conveyor, said ejector plates being aligned with the receptacle and adapted to be passed through said slotted top and bottom walls thereof between a side and a stack in said receptacle, and means for moving the ejector plates toward said open side to eject a stack from said receptacle.

14. The combination described in claim 13, said receptacle having an end wall, said stack of envelopes being received in the receptacle in spaced relation to said end wall, and means intermediate the stack-holding devices and said ejector plates for rapidly oscillating said receptacle from a substantially horizontal position to a position wherein the receptacle is inclined downward toward said end wall and back to said substantially horizontal position, whereby to jog said stack against said end wall and bring the edges of the envelopes of the stack adjacent said wall into alignment with one another.

15. In combination a conveyor comprising an endless belt, means for supporting and driving said belt, said means including an end roll around which the belt passes, a pair of longitudinally aligned, spaced rows of lugs on the belt, adjacent lugs in each row being transversely aligned, said lugs defining surfaces on the belt upon which stacks of envelopes may be laid, a stationary stack receiver disposed adjacent the end roll, said receiver comprising transversely spaced fixed supports disposed to allow the lugs to pass between them, said stack receiver having downwardly inclined supporting surfaces for the stack and upwardly inclined stops to limit downward movement of the stacks on said inclined supporting surfaces, and means for pushing a stack upon said inclined supporting surfaces from said belt independently of said lugs, said means for pushing a stack upon said inclined supporting surfaces comprising a plurality of transversely aligned tines disposed at right angles with the said belt surfaces, a support for said tines in which the tines are slidable by gravity toward said belt surfaces, a carriage disposed adjacent the belt, means on the carriage for raising and lowering said tine support relative to the belt, and means on the belt supporting means and connected to the carriage for moving the carriage relative to the belt.

16. In combination a conveyor comprising an endless belt, means for supporting and driving said belt, said means including an end roll around which the belt passes, a pair of longitudinally aligned, spaced rows of lugs on the belt, adjacent lugs in each row being transversely aligned, said lugs defining surfaces on the belt upon which stacks of envelopes may be laid, a stationary stack receiver disposed adjacent the end roll, said receiver comprising transversely spaced fixed supports disposed to allow the lugs to pass between them, said stack receiver having downwardly inclined supporting surfaces for the stack and upwardly inclined stops to limit downward movement of the stacks on said inclined supporting surfaces, and means for pushing a stack upon said inclined supporting surfaces from said belt independently of said lugs, said means for pushing a stack upon said inclined supporting surfaces comprising a plurality of transversely aligned tines disposed at right angles with the said belt surfaces, a support for said tines in which the tines are slidable by gravity toward said belt surfaces, a carriage disposed adjacent the belt, means on the carriage for raising and lowering said tine support relative to the belt to raise said tines over a stack and to lower said tines behind a stack, means operated by the belt to control the tine raising and lowering means as a function of the movement of the belt, and means on the belt supporting means and connected to the carriage for moving the carriage relative to the belt.

17. In combination a conveyor comprising an endless belt, means for supporting and driving said belt, said means including an end roll around which the belt passes, a pair of longitudinally aligned, spaced rows of lugs on the belt, adjacent lugs in each row being transversely aligned, said lugs defining surfaces on the belt upon which stacks of envelopes may be laid, a stationary stack receiver disposed adjacent the end roll, said receiver comprising transversely spaced fixed supports disposed to allow the lugs to pass between them, said stack receiver having downwardly inclined supporting surfaces for the stack and upwardly inclined stops to limit downward movement of the stacks on said inclined supporting surfaces, and means for pushing a stack upon said inclined supporting surfaces from said belt independently of said lugs, said means for pushing a stack upon said inclined supporting surfaces comprising transversely spaced rollers adjacent the end roll, a shaft for the rollers having an axis parallel with the axis of the end roll, and means for driving the spaced rollers from the end roll in the same direction as the end roll, the operative cylindrical surfaces of the spaced rollers being adapted to support and drive the stack toward the stack receiver.

18. In combination a conveyor comprising an endless belt, means for supporting and driving said belt, said means including an end roll around which the belt passes, a pair of longitudinally aligned, spaced rows of lugs on the belt, adjacent lugs in each row being transversely aligned, said lugs defining surfaces on the belt upon which stacks of envelopes may be laid, a stationary stack receiver disposed adjacent the end roll, said receiver comprising transversely spaced fixed supports disposed to allow the lugs to pass between them, said stack receiver having downwardly inclined supporting surfaces for the stack and upwardly inclined stops to limit downward movement of the stacks on said inclined supporting surfaces, and means for pushing a stack upon said inclined supporting surfaces from said belt independently of said lugs, said means for pushing a stack upon said inclined supporting surfaces comprising a plurality of transversely aligned tines disposed at right angles with the said belt surfaces, a support for said tines in which the tines are slidable by gravity toward said belt surfaces, a carriage disposed adjacent the belt, means on the carriage for raising and lowering said tine support relative to the belt, means connected to the carriage for moving the carriage relative to the belt, transversely spaced rollers adjacent the end roll, a shaft for the rollers having an axis parallel with the axis of the end roll, and means for driving the spaced rollers from the end roll in the same direction as the end roll, the operative cylindrical surfaces of the spaced rollers being adapted to support and drive the stack toward the stack receiver.

19. In combination, a fixed support for a stack of envelopes or the like disposed one upon the other, and a vertically movable conveyor for transporting said stack to a higher level, said vertically movable conveyor having stack-carrying buckets, each bucket including a bracket and a sheet metal container secured thereto, said container having a side adjacent the bracket, an open side opposite the first-mentioned side through which a stack is received in the bucket, an end connected to the first-mentioned side, and a plurality of fingers extending from the first-mentioned side and comprising the bottom of the bucket, said fixed support comprising spaced plates having stack-supporting ends, said plates being adapted to pass between the said fingers as the bucket removes a stack from the fixed support, each said bucket being larger than the stack, said fixed support being adapted to support a stack at a location spaced from said end, and means connected to said bracket for rotating said bracket and the bucket secured thereto from a substantially horizontal position of the bucket to a substantially vertical position of the bucket with said end lowermost, and then to said substantially horizontal bucket position.

References Cited in the file of this patent
UNITED STATES PATENTS

| | | |
|---|---|---|
| 1,275,988 | Juengst | Aug. 13, 1918 |
| 1,362,034 | Olson | Dec. 14, 1920 |
| 1,459,246 | Parker | June 19, 1923 |